(12) United States Patent
Brack et al.

(10) Patent No.: US 12,180,881 B2
(45) Date of Patent: Dec. 31, 2024

(54) INTAKE SYSTEM FOR AN INTERNAL COMBUSTION ENGINE, IN PARTICULAR OF A MOTOR VEHICLE

(71) Applicant: Bayerische Motoren Werke Aktiengesellschaft, Munich (DE)

(72) Inventors: Wolfgang Brack, Munich (DE); Konstantin Kordvee, Munich (DE); Lukas Schaefer, Munich (DE); Florian Schwarzmueller, Unterschleissheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/692,167

(22) Filed: Nov. 22, 2019

(65) Prior Publication Data
US 2020/0088091 A1 Mar. 19, 2020

Related U.S. Application Data

(63) Continuation of application No. PCT/EP2018/063238, filed on May 18, 2018.

(30) Foreign Application Priority Data

May 23, 2017 (DE) .................... 10 2017 208 683.1

(51) Int. Cl.
*F02B 31/04* (2006.01)
*F02F 1/42* (2006.01)
*F02M 35/10* (2006.01)

(52) U.S. Cl.
CPC ............ *F02B 31/04* (2013.01); *F02F 1/4235* (2013.01); *F02B 2275/48* (2013.01);
(Continued)

(58) Field of Classification Search
CPC ...... F02B 31/04; F02B 31/00; F02B 2275/48; F02F 1/42; F02F 1/4235;
(Continued)

(56) References Cited

U.S. PATENT DOCUMENTS 2,046,797 A * 7/1936 Swan ................ F02M 1/00
123/184.32
2,989,956 A * 6/1961 Drinkard .......... F02M 1/00
123/545
(Continued)

FOREIGN PATENT DOCUMENTS

AT 001 790 U1 11/1997
AT 501 934 B1 5/2008
(Continued)

OTHER PUBLICATIONS

International Search Report (PCT/ISA/220 & PCT/ISA/210) issued in PCT Application No. PCT/EP2018/063238 dated Jul. 5, 2018 with English translation (nine pages).
(Continued)

*Primary Examiner* — Grant Moubry
(74) *Attorney, Agent, or Firm* — Crowell & Moring LLP

(57) ABSTRACT

An intake system for an internal combustion engine has at least one inlet channel through which air can flow and by which the air flowing through the inlet channel is to be conducted into at least one combustion chamber of the internal combustion engine. The inlet channel is, on the bottom side thereof, of flat form at least in one length region, wherein the flat bottom side extends as far as a tumble edge by which a tumbling flow of the air flowing into the combustion chamber can be effected.

11 Claims, 3 Drawing Sheets

(52) U.S. Cl.
CPC ............... *F02F 2001/4207* (2013.01); *F02M 35/10288* (2013.01); *F02M 35/10367* (2013.01)

(58) Field of Classification Search
CPC ...... F02F 2001/4207; F02M 35/10288; F02M 35/10367; F02M 35/104
See application file for complete search history.

(56) References Cited

U.S. PATENT DOCUMENTS

| | | | | |
|---|---|---|---|---|
| 4,872,424 | A * | 10/1989 | Carnes | F02M 35/10072 123/184.32 |
| 7,866,670 | B2 * | 1/2011 | Dhole | F16J 15/122 277/592 |
| 8,011,352 | B2 * | 9/2011 | Shinkai | F02M 26/12 123/568.17 |
| 8,733,312 | B1 * | 5/2014 | Kever | F02M 35/116 123/184.48 |
| 9,163,594 | B1 * | 10/2015 | Kever | F02M 35/10091 |
| 9,267,471 | B2 * | 2/2016 | Kato | F02M 35/10085 |
| 9,273,653 | B2 * | 3/2016 | Wilson | F02M 35/10078 |
| 10,267,272 | B2 * | 4/2019 | Ito | F02M 35/10255 |
| 2003/0034001 | A1 | 2/2003 | Herold et al. | |
| 2004/0194750 | A1 * | 10/2004 | Tanikawa | F02M 35/10039 123/184.42 |
| 2008/0078356 | A1 * | 4/2008 | Akagawa | F02B 31/06 123/403 |
| 2008/0143056 | A1 * | 6/2008 | Dhole | F02F 11/00 277/596 |
| 2010/0147249 | A1 | 6/2010 | Mamy et al. | |
| 2015/0322883 | A1 | 11/2015 | Dopke et al. | |
| 2019/0093595 | A1 | 3/2019 | Zhang et al. | |

FOREIGN PATENT DOCUMENTS

| | | |
|---|---|---|
| CN | 101675237 A | 3/2010 |
| CN | 105673248 A | 6/2016 |
| CN | 105863868 A | 8/2016 |
| DE | 101 40 314 A1 | 2/2003 |
| DE | 10 2004 049 588 A1 | 4/2006 |
| DE | 10 2005 020 228 A1 | 11/2006 |
| DE | 10 2012 012 796 A1 | 11/2013 |
| DE | 10 2015 009 008 A1 | 1/2017 |
| EP | 2 101 055 A1 | 9/2009 |
| EP | 2 937 531 A2 | 10/2015 |
| FR | 2 914 360 A1 | 10/2008 |
| FR | 2 922 590 A1 | 4/2009 |
| WO | WO 2007/056784 A2 | 5/2007 |
| WO | WO 2008/104504 A2 | 9/2008 |

OTHER PUBLICATIONS

German-language Written Opinion (PCT/ISA/237) issued in PCT Application No. PCT/EP2018/063238 dated Jul. 5, 2018 (five pages).

German-language Search Report issued in counterpart German Application No. 10 2017 208 683.1 dated Feb. 26, 2018 with partial English translation (12 pages).

Chinese-language Office Action issued in Chinese Application No. 201880033810.3 dated Mar. 30, 2021 with English translation (12 pages).

German-language Office Action issued in German Application No. 10 2017 208 683.1 dated Sep. 8, 2021 (six (6) pages).

* cited by examiner

INTAKE SYSTEM FOR AN INTERNAL COMBUSTION ENGINE, IN PARTICULAR OF A MOTOR VEHICLE

CROSS REFERENCE TO RELATED APPLICATIONS

This application is a continuation of PCT International Application No. PCT/EP2018/063238, filed May 18, 2018, which claims priority under 35 U.S.C. § 119 from German Patent Application No. 10 2017 208 683.1, filed May 23, 2017, the entire disclosures of which are herein expressly incorporated by reference.

BACKGROUND AND SUMMARY OF THE INVENTION

The invention relates to an intake system for an internal combustion engine, in particular of a motor vehicle.

An intake system for an internal combustion engine, in particular of a motor vehicle, is already known, for example, from DE 101 40 314 A1. Here, the intake system has at least one inlet duct, through which air can flow and by means of which the air which flows through the inlet duct can be conducted into at least one combustion chamber of the internal combustion engine. The combustion chamber is configured, for example, as a cylinder. Here, the inlet duct is of flat or planar configuration at least in one length region on its underside.

Moreover, DE 10 2012 012 796 A1 discloses an internal combustion engine for a motor vehicle, which internal combustion engine has a cylinder head with at least one inlet duct.

It is an object of the present invention to provide an intake system, with the result that particularly efficient operation of an internal combustion engine can be realized.

The intake system according to the invention for an internal combustion engine which is configured, in particular, as a reciprocating piston engine, in particular of a motor vehicle, has at least one inlet duct, through which air can flow and by which the air which flows through the inlet duct can be conducted, that is to say is capable of being conducted, into at least one combustion chamber of the internal combustion engine. The intake system is usually arranged in an intake section of the internal combustion engine which can be supplied by way of the intake section with the air which flows through the intake section. Here, the intake system comprises, for example, at least one intake manifold.

In particular, the air which flows through the inlet duct can be charge air, that is to say compressed air, which is or was compressed by at least one compressor which is arranged in the intake section. Here, the inlet duct is of flat or planar configuration at least in one length region on an underside. In other words, on its underside, the inlet duct has at least one length region, in which the inlet duct is of flat or planar configuration.

In order for it to then be possible for particularly efficient and therefore low-emissions and low-energy consumption, in particular low-fuel consumption, operation of the internal combustion engine to be realized, it is provided according to the invention that the flat underside or the flat length region extends as far as a tumble edge, by which a tumble-shaped flow of the air which flows into the combustion chamber can be brought about. The air which has the tumble flow flows in an at least substantially cylindrical manner into the combustion chamber which is configured, for example, as a cylinder, the flow running in the cylindrical manner, for example, about a tumble axis which runs perpendicularly with respect to the cylinder axis. It has been found that a particularly high charge movement of a charge which flows into the combustion chamber which is configured, for example, as a cylinder can be realized by means of the intake system according to the invention and, in particular, by means of the inlet duct. A higher charge movement leads to improved mixture preparation and higher turbulent kinetic energy (TKE), which results in a particularly high rate of combustion.

It has been found that an increase of the charge movement by from 40 to 70% in comparison with conventional intake systems, in particular in a manner which is dependent on an operating point of the internal combustion engine, can be realized by the intake system according to the invention. Moreover, an increase in the TKE by up to 100% in the range of the ignition time can be realized, in particular in combination with corresponding adaptations of a combustion chamber roof and a piston which, for example, in each case partially delimit the combustion chamber. Here, for example, the combustion chamber roof is formed by way of a cylinder head of the internal combustion engine.

Improved mixture preparation and more rapid combustion in comparison with conventional intake systems can therefore be realized by way of the intake system according to the invention, which leads to an improved thermodynamic degree of efficiency. As a consequence, the fuel consumption and therefore the $CO_2$ emissions of the internal combustion engine can be kept within a particularly low limit.

It has been shown to be particularly advantageous, furthermore, if the inlet duct is drawn down to a great extent at or as far as a valve seat ring, in particular with retention of the distinct tumble edge, as a result of which a particularly high charge movement can be realized. The valve seat ring forms, for example, a valve seat for a gas exchange valve which is assigned to the inlet duct, is also called an inlet valve, and can be moved, in particular translationally, for example, between a closed position, in which it closes the inlet duct fluidically, and at least one open position, in which it releases the inlet duct. In the closed position, the gas exchange valve closes the inlet duct, with the result that, for example, the air which flows through the inlet duct cannot flow out of the inlet duct and into the combustion chamber. In the open position, however, the gas exchange valve releases the inlet duct, with the result that the air can flow out of the inlet duct and into the combustion chamber.

It has been shown to be particularly advantageous if the inlet duct is of asymmetrical configuration in cross section at least in one length region on its upper side which lies opposite the underside. In other words, the inlet duct has, in particular in one of its plurality of duct branches, an asymmetrical cross-sectional shape, as a result of which a particularly advantageous charge movement can be realized.

A further embodiment provides that the tumble edge is produced by way of machining, in particular by way of milling. As a result, a particularly advantageous charge movement can be realized, with the result that particularly advantageous filling and mixture preparation can be provided.

In one particularly advantageous refinement of the invention, the tumble edge is produced by milling which is rotationally symmetrical with respect to a valve axis of a gas exchange valve. The valve axis is an axis of the gas exchange valve which is configured, for example, as an inlet valve, can be moved, in particular translationally, for example along the axis, between a closed position and at least one open position, and/or is of at least substantially rotationally symmetrical configuration in relation to the valve axis.

Here, the tumble edge is produced, for example, by a pear-shaped and/or spherical cutter. It has been found that the tumble edge can be produced particularly advantageously by a pear-shaped and/or spherical cutter of this type. The pear-shaped and spherical cutter is, for example, of pear-shaped configuration in a first part region and of spherical configuration in a second part region which is different than the first part region.

A further embodiment is distinguished by the fact that the inlet duct is machined on its underside, in order for it to be possible for a particularly advantageous charge movement to be realized with a particularly low loss. The inlet duct is preferably not machined completely on its underside, but rather merely locally and therefore only in at least one part region, in particular in the region of the tumble edge.

The machining of the underside is preferably provided in addition to the machining for producing the tumble edge, the additional machining being realized, for example, by means of an end mill, a pear-shaped cutter, a spherical cutter and/or a side milling cutter. For example, the additional machining is produced by at least two machining steps. In the case of a first one of the machining steps, for example, the inlet duct is machined on its underside at least in one part region by way of the abovementioned, combined pear-shaped and spherical cutter. In the case of a second one of the machining steps which follows the first machining step, the inlet duct is machined on its underside at least in one part of the part region by way of an end mill or side milling cutter.

In order to realize a particularly advantageous charge movement here, it is preferably provided that the inlet duct is machined on its underside as far as the abovementioned valve seat ring, said machining preferably being provided only in the region of the tumble edge.

It has been shown to be particularly advantageous, furthermore, if the flat or planar underside or the flat or inner length region ends at the tumble edge, as a result of which a particularly advantageous charge movement can be produced.

A further embodiment provides that, on its upper side, the inlet duct has at least one clearance portion for spray jets of an injector which is configured for bringing about an intake manifold injection. During the intake manifold injection, for example, at least one medium, in particular a liquid, can be injected into the inlet duct. The medium can preferably comprise a fuel, in particular a liquid fuel, for operating the internal combustion engine. As an alternative or in addition, the medium comprises, for example, water and/or another liquid.

On its upper side, for example, the inlet duct has at least one fastener, by means of which the abovementioned injector which is also called an intake manifold injector can be fastened to the inlet duct. The fastener comprises, for example, a receptacle, in which the injector can be received at least partially. The clearance portion is, for example, a through opening, through which the spray jets can flow. Here, the injector ejects the spray jets, in order to inject a fuel which is, in particular, liquid for operating the internal combustion engine into the inlet duct. An intake manifold injection means is therefore provided.

Excessive wetting of the inlet duct or of walls of the inlet duct can be avoided by way of the clearance portion, with the result that particularly advantageous mixture preparation can be produced. In particular, the injector ejects the spray jets along an injection direction, or the spray jets penetrate the clearance portion or the through opening along the injection direction, it preferably being provided that the clearance portion widens along the injection direction and here, in particular, in the direction of the inlet duct, or has a flow cross section which widens in the injection direction and through which the spray jets can flow. As a result, the possibility can be provided of realizing an intake manifold injector, it being possible for an intake manifold injector of this type to be combined, for example, with a direct fuel injector, or else to be used without a direct fuel injector of this type.

The invention also comprises a method for producing an intake system according to the invention. Advantages and advantageous refinements of the intake system according to the invention are to be considered to be advantages and advantageous refinements of the method according to the invention, and vice versa.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, identical or functionally identical elements are provided with identical designations.

DETAILED DESCRIPTION OF THE DRAWINGS

Figure 1:
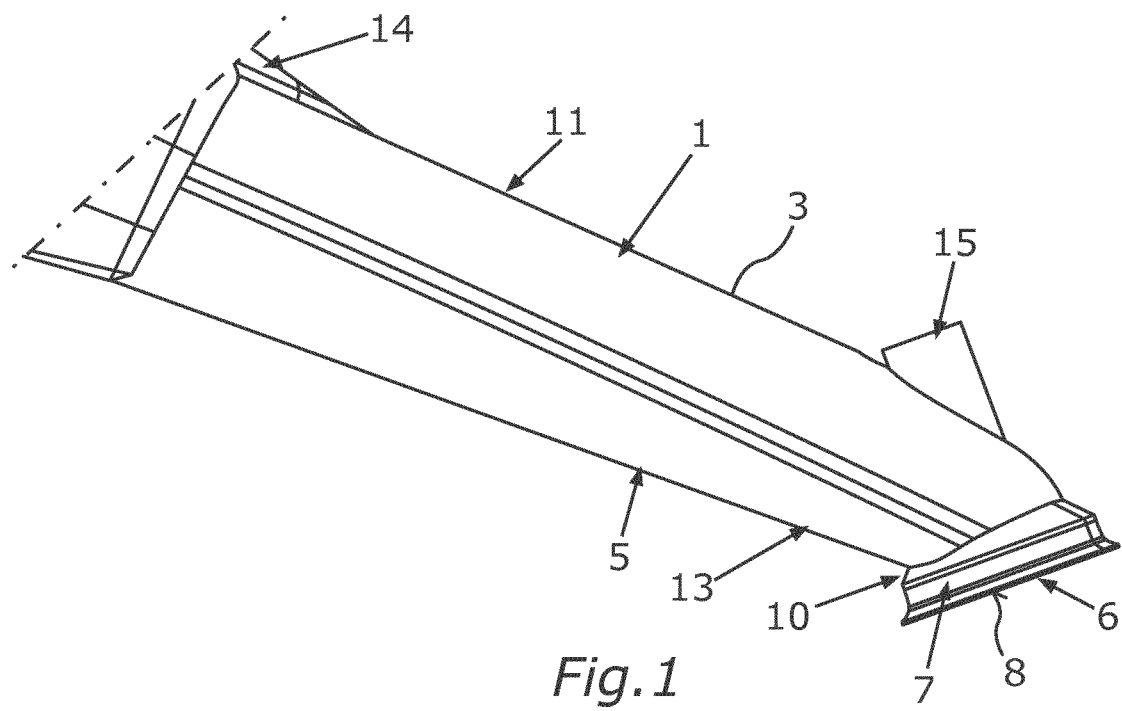
FIG. 1 is a diagrammatic side view of an intake system according to an embodiment of the invention, having at least one inlet duct, the flat underside of which extends as far as a tumble edge.

FIG. 1 shows a diagrammatic side view of an intake system (denoted overall by 1) for an internal combustion engine (not shown in greater detail in the figures) which is preferably configured as a reciprocating piston engine. The internal combustion engine is, for example, a constituent part of a drive train of a motor vehicle which can be configured as a car, in particular as a passenger car, and can be driven by way of the internal combustion engine. Here, the internal combustion engine has at least one combustion chamber which is configured, in particular, as a cylinder and is formed, for example, by way of an engine housing of the internal combustion engine.

The engine housing is, for example, a crankcase, in particular a cylinder crankcase. During combustion operation of the internal combustion engine, the cylinder is supplied with air and fuel, in particular liquid fuel, for operating the internal combustion engine. The fuel is injected directly into the cylinder, for example, by way of a direct fuel injection system. As an alternative or in addition, it is conceivable that what is known as an intake manifold injection system is provided. Within the context of the intake manifold injection system, the fuel is not perhaps injected directly into the cylinder, but rather into the intake system 1 at a point which is arranged upstream of the cylinder, and is entrained, for example, by the air which flows through the intake system 1, and is transported into the cylinder. The intake system 1 is arranged in an intake section of the internal combustion engine, through which intake section air can flow, with the result that the air which is to be fed to the cylinder is conducted to and, in particular, into the cylinder by way of the intake system 1.

Figure 2:
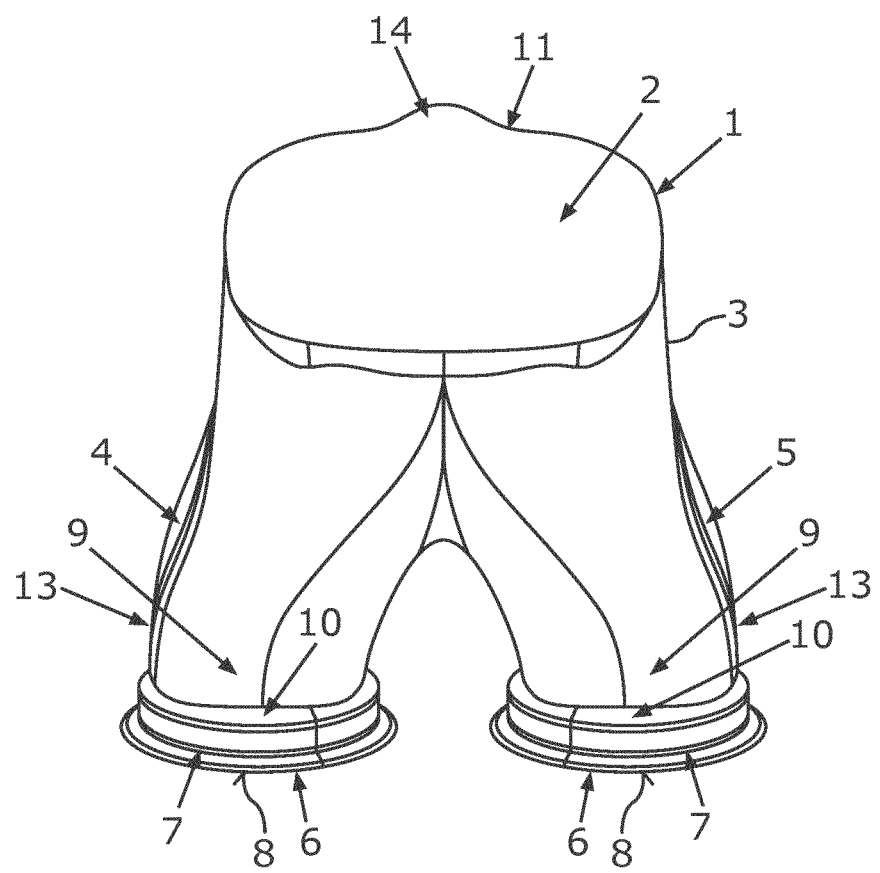
FIG. 2 shows details of a diagrammatic rear view of the intake system.

To this end, the intake system 1 comprises at least one inlet duct 2 which can be seen particularly clearly in combination with FIG. 2, through which the air to be fed to the cylinder can flow, and which is formed or delimited, for example, by way of a duct element 3 of the intake system 1. In particular, the inlet duct 2 is provided in the abovementioned cylinder head and is formed by way of the cylinder head, with the result that, for example, the duct element 3 is formed by way of the cylinder head or the cylinder head is the duct element 3. The abovementioned point, at which the fuel is injected into the intake system 1 within the context of the intake manifold injection system, is provided, for example, in the inlet duct 2, with the result that the fuel is injected into the inlet duct 2 within the context of the intake manifold injection system.

Figure 3:
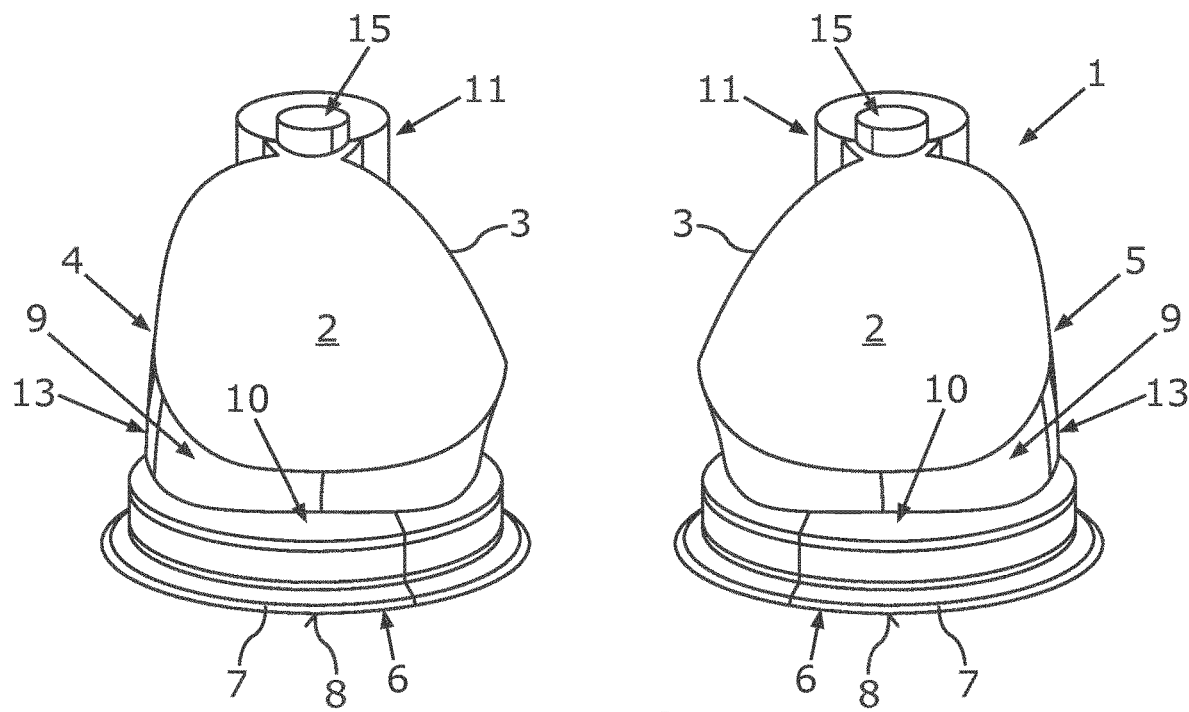
FIG. 3 shows details of a further diagrammatic rear view of the intake system.

It can be seen particularly clearly from FIGS. 2 and 3 that the inlet duct 2 branches into two duct parts 4 and 5 which are also called duct branches, in particular in the flow direction of the air which flows through the inlet duct 2. The duct branches for their part form respective inlet ducts, via which the air can flow into the cylinder. Here, the respective duct part 4 or 5 has an outflow opening 6 which is configured as a through opening and via which the air which flows through the inlet duct 2 can flow out of the duct branches and therefore out of the inlet duct 2 overall.

In the finally produced state of the internal combustion engine, the respective duct branch is assigned a gas exchange valve which is configured as an inlet valve and can be moved, in particular translationally, between a closed position and at least one open position, in particular relative to the duct element 3. In the closed position, the respective inlet valve closes the respective outflow opening 6, with the result that the air cannot flow via the outflow opening 6 out of the inlet duct 2 into the cylinder. In the open position, however, the respective inlet valve releases the respective outflow opening 6, with the result that air can then flow via the respective outflow opening 6 out of the inlet duct 2 into the cylinder. Here, the gas exchange valve has a valve axis, along which the gas exchange valve can be moved, for example, between the closed position and the open position. In particular, the valve axis is a center axis, the gas exchange valve being, for example, of rotationally symmetrical configuration in relation to the valve axis or center axis.

Furthermore, the respective outflow opening 6 or the respective duct branch is assigned a valve seat ring 7, by way of which a respective valve seat 8 for the respective inlet valve is formed. In the closed position, the respective inlet valve is seated on the respectively associated valve seat 8, as a result of which the respective outflow opening 6 is closed fluidically. Here, for example, the duct element 3 and the valve seat ring 7 are configured as components which are produced separately from one another and, in particular, are connected to one another, it being possible for said components to preferably be formed from materials which are different than one another.

It can be seen particularly clearly from FIGS. 1 to 3 that the inlet duct 2 or the duct element 3 is of flat or planar configuration on its underside 9 at least in one length region and here, in particular, in the region of the respective duct branches.

In order for it then to be possible for particularly efficient and therefore low-fuel consumption and low-emissions operation of the internal combustion engine to be realized, it is provided in the case of the intake system 1 that the flat underside 9 extends as far as a respective tumble edge 10 of the respective duct branch, it being possible for a tumble-shaped flow of the air which flows into the cylinder to be brought about by means of the tumble edge 10. Moreover, the inlet duct 2 is drawn down to a great extent at the respective valve seat ring 7 with retention of the distinct tumble edge 10. Moreover, it is provided that (as can be seen, in particular, from FIG. 3) the inlet duct is of asymmetrical configuration in cross section on its upper side 11 which lies opposite the underside 9, in particular in the region of the respective duct branch. In other words, the respective upper side 11 of the individual duct branches is asymmetrical in cross section. By way of said configuration of the inlet duct 2, a particularly high charge movement can be realized, with the result that particularly advantageous mixture preparation and particularly rapid combustion can be realized. This results in a particularly high thermodynamic degree of efficiency, with the result that the fuel consumption of the internal combustion engine can be kept particularly low.

Figure 4:
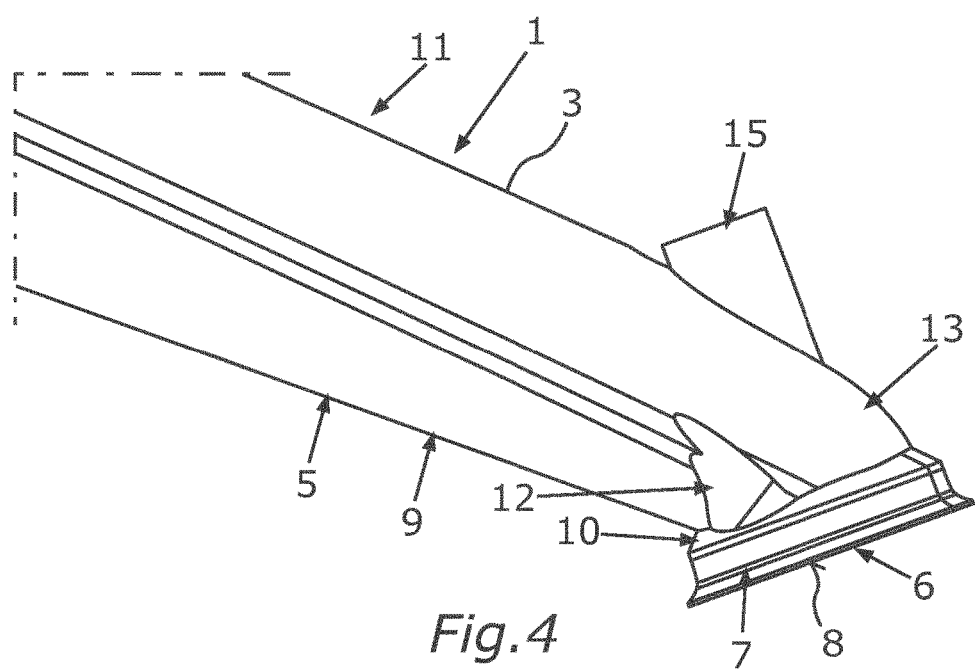
FIG. 4 shows details of a diagrammatic side view of the intake system.
Figure 5:
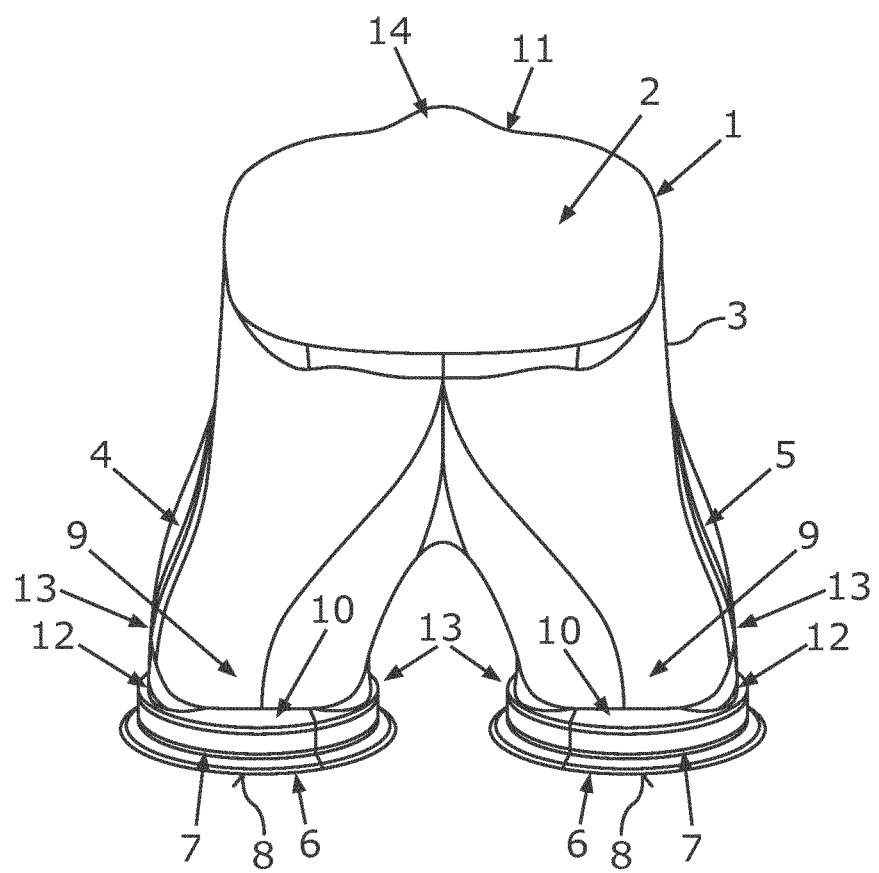
FIG. 5 shows details of a further diagrammatic rear view of the intake system.

It has been shown to be particularly advantageous, furthermore, if the respective tumble edge 10 is produced by milling which is rotationally symmetrical with respect to a valve axis of a gas exchange valve. Here, for example, the inlet duct 2 is machined at least in a part region by use of a pear-shaped and/or spherical cutter, the respective tumble edge 10, in particular, being produced by use of a pear-shaped and/or spherical cutter of this type, in particular within the context of said milling. As can be seen particularly clearly from FIGS. 4 and 5, the inlet duct 2 has, moreover, a further, additional machined portion which is produced, for example, by an end mill or side milling cutter at least in respective part regions 12. By way of said further, additional machined portion, the inlet duct 2 is widened on its underside 9 and preferably on at least one side 13 which is arranged between the underside 9 and the upper side 11. In other words, the further, additional machined portion is provided at least laterally, with the result that the inlet duct 2 is also widened laterally by way of said further, additional machined portion. In particular, the inlet duct 2 is machined or widened by way of the additional, further machined portion at most as far as the valve seat ring 7. In other words, the additional further machined portion is preferably conducted as far to the outside as possible and in the process at most as far as the valve seat ring 7.

In order to realize the intake manifold injection system, at least one fastener (cannot be seen in the figures) is provided, in particular per duct branch, by means of which fastener an injector for bringing about the intake manifold injection can be fastened to the intake system 1 or to the duct element 3. The respective injector is also called an intake manifold injector, the respective injector providing, that is to say ejecting or spraying, at least one or more spray jets, in particular within the context of the intake manifold injection. The respective spray jet is formed by way of the abovementioned fuel for operating the internal combustion engine and/or by way of another (in particular, liquid) medium, and is injected into the inlet duct 2. Here, the spray jet widens or the spray jets widen along an injection direction, in particular starting from the injector. The fastener comprises, for example, a receptacle, in which the respective injector can be received at least partially. The receptacle is configured, for example, as a through opening, and has a length region, through which the spray jets can be sprayed. Here, a clearance portion 14 is preferably provided for the spray jets, with the result that excessive wetting of walls of the duct element 3 with the fuel can be avoided. Moreover, the fasteners are arranged on the upper side 11, with the result that the injectors can be mounted particularly simply. The fasteners or the clearance portions 14 represent an allowance for the intake manifold injection system, with the result that the intake manifold injection system can optionally be used or else can be dispensed with.

Furthermore, a guide 15 which is configured, for example, as a through opening is provided per duct branch, by means of which guide 15 the respective gas exchange valve is guided during its movements between the closed position and the open position.

It has been found that the inlet duct 2 generates a particularly high charge movement of the air. This leads to advantageous mixture preparation and to high turbulent kinetic energy of the air which flows into the cylinder. This results in a particularly high combustion rate, with the result that particularly efficient operation of the internal combustion engine can be produced.

LIST OF DESIGNATIONS

1 Intake system
2 Inlet duct
3 Duct element
4 Duct part
5 Duct part
6 Outflow opening
7 Valve seat ring
8 Valve seat
9 Underside
10 Tumble edge
11 Upper side
12 Part region
13 Side
14 Clearance portion
15 Guide The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An intake system for an internal combustion engine, comprising:
    at least one inlet duct through which air flows and by which the air which flows through the inlet duct is conducted into at least one combustion chamber of the internal combustion engine, wherein
        the inlet duct has a flat underside at least in one length region on the underside,
        the flat underside is located in a region where the at least one inlet duct branches and extends as far as a tumble edge, by which a cylindrical tumble-shaped flow of the air which flows into the combustion chamber is effected,
        the cylindrical tumble-shaped flow tumbles about a tumble axis which runs perpendicularly with respect to a cylinder axis, and
        the tumble edge is immediately adjacent to a valve seat ring that is defined at an outflow opening of the intake system.
2. The intake system according to claim 1, wherein the inlet duct is of asymmetrical configuration in cross section at least in one length region on an upper side which lies opposite the underside.
3. The intake system according to claim 2, wherein the inlet duct is machined on at least one side which is arranged between the underside and the upper side.
4. The intake system according to claim 3, wherein the inlet duct is machined by way of an end mill or side mill cutter.
5. The intake system according to claim 1, wherein the tumble edge is produced by machining.
6. The intake system according to claim 5, wherein the tumble edge is produced by milling which is rotationally symmetrical with respect to a valve axis of a gas exchange valve.
7. The intake system according to claim 1, wherein the inlet duct is machined on the underside.
8. The intake system according to claim 7, wherein the inlet duct is machined on the underside by way of an end mill, a pear-shaped cutter, a spherical cutter and/or a side milling cutter.
9. The intake system according to claim 7, wherein the inlet duct is machined on the underside as far as a valve seat ring.
10. The intake system according to claim 7, wherein the inlet duct is widened by way of the machining.
11. The intake system according to claim 1, wherein on an upper side, the inlet duct has at least one clearance portion for spray jets of an injector which is configured for bringing about an intake manifold fuel injection.

* * * * *